United States Patent Office 3,359,289
Patented Dec. 19, 1967

3,359,289
PROCESS FOR THE PREPARATION OF 9α-FLUORO STEROIDS AND PRODUCTS OBTAINED THEREFROM
Arturo Blade, Rosny-sous-Bois, France, assignor to Roussel-UCLAF, Paris, France, a corporation of France
No Drawing. Filed Aug. 4, 1965, Ser. No. 508,402
Claims priority, application France, Aug. 12, 1964, 984,987
13 Claims. (Cl. 260—397.45)

ABSTRACT OF THE DISCLOSURE

The present invention relates to a new process for the preparation of a 9α-fluoro steroid which comprises the steps of reacting an acid anhydride of an alkanoic acid having from two to seven carbon atoms with an 11-oxo steroid of the androstane and pregnane series, free from other carbonyl groups in its molecule, in the presence of an acidic catalyst, reacting the resultant ester of an alkanoic acid having from two to seven carbon atoms with a 9,11-dehydro-11-ol steroid of the androstane and pregnane series with perchloryl fluoride in the presence of an organic solvent and recovering a 9α-fluoro-11-oxo steroid of the androstane and pregnane series. The invention also relates to the intermediate and final 9α-fluoro-11-oxygenated steroids which are useful as intermediates in the synthesis of physiologically active steroids.

In the classic process for the preparation of 9α-fluorinated steroid derivatives, the fluorinating agent, as is well known, is hydrofluoric acid. This process consists in the transformation of an 11-ketonic derivative into a corresponding alcohol, the dehydration of which furnishes the 9,11-dehydro derivative. This 9,11-dehydro derivative then serves to form the 9α-bromo 11β-hydroxylated derivative of the same, which, under the action of an alkaline agent, supplies the 9β,11β-epoxide. And it is only this last-named derivative which, brought into the presence of the fluorinating agent, which is hydrofluoric acid, gives the desired 9α-fluorinated derivative (for example, according to the process described in U.S. Patent No. 3,007,923). This manner of introducing fluorine requires, consequently, a relatively long series of reactions.

On the other hand, for more than 10 years, another fluorinating agent, perchloryl fluoride, has been known, and several publications have, since then, described the employment of this reagent for the purpose of introducing fluorine at various points on the steroid molecule; however, no author has accomplished the most important fluorination in this series, namely the introduction of this halogen in the 9α position utilizing perchloryl fluoride.

It was known, in addition, that the enolic acetates of the saturated ketones were rather inert to perchloryl fluoride under normal conditions of reaction, and that the more nucleophilic enamides were preferred in order to obtain α-fluorinated ketones [E. V. Jensen et al., J. Org. Chem. 27, 702 (1962)].

It was also known that the attack of a 17-enol acetate of a steroid by perchloryl fluoride occurred with considerable difficulties and, if it led to the 16-fluorinated products, these were contaminated by chlorinated derivatives which were difficult to eliminate.

An object of the present invention is the development of a process for the preparation of a 9α-fluoro steroid which comprises the steps of reacting an acid anhydride of an alkanoic acid having from two to seven carbon atoms with an 11-oxo steroid, free from other ketones in its molecule, in the presence of an acidic catalyst, reacting the resultant 9,11-dehydro-11-ol ester of the corresponding steroid with perchloryl fluoride in the presence of an organic solvent, and recovering the 9α-fluoro-11-oxygenated steroid.

A further object of the present invention is the development of a process for the preparation of a 9α-fluoro-11-oxygenated steroid of the pregnane and androstane series which comprises the steps of reacting an acid anhydride of an alkanoic acid having from two to seven carbon atoms with a saturated 11-oxo-steroid of the pregnane and androstane series, free from other ketones in its molecule, in the presence of an acidic catalyst selected from the group consisting of organic sulfonic acids and mineral acids, reacting the resultant 9,11-dehydro-11-ol ester of a saturated steroid of the pregnane and androstane series with gaseous perchloryl fluoride in the presence of a tertiary cyclic amine and a di-lower-alkyl-amide of a lower alkanoic acid, and recovering said 9α-fluoro-11-oxygenated steroid of the pregnane and androstane series.

A yet further object of the present invention is the obtention of the novel intermediate and final compounds:

3α,11,20β-triacetoxy-16α-methyl-$\Delta^{9(11)}$-5β-pregnene
3α,11,20β-tripropionoxy-$\Delta^{9(11)}$-5β-pregnene
9α-fluoro-5β-pregnane-3α,20β-diol-11-one
9α-fluoro-5β-pregnane-3α,11β,20β-triol
9α-fluoro-16α-methyl-5β-pregnane-3α,20β-diol-11-one.

These and other objects of the present invention will become more apparent as the description thereof proceeds.

It has now been discovered that, in a startling manner, the enol esters formed from aliphatic carboxylic acids, having from two to seven carbon atoms, in the 11 position of steroids, easily react with the perchloryl fluoride despite the well known steric hindrance of this position of the molecule.

By means of a concise reaction, the fluorine is accordingly introduced in the 9α position and the 9α-fluoro-11-ketonic derivatives of the steroids are obtained, which are easy to isolate from the reaction media and which present a satisfactory degree of purity.

Further advantages will become evident to anyone skilled in the art from the following.

The process, object of the invention, is characterized in that the acid anhydride of an aliphatic carboxylic acid, preferably an alkanoic acid, having from two to seven carbon atoms, is reacted with an 11-oxo steroid which does not show any other ketone functions on its molecule in the presence of an acid catalyst, then the reaction product, an enol ester, is reacted with perchloryl fluoride, and in this way the corresponding 9α-fluoro 11-ketonic derivative is obtained.

The execution of this novel process, object of the invention, may be characterized advantageously by the following points:

1. The enolization of the ketone in the 11 position with the formation of an ester of the enol is obtained by action of an acid anhydride of an aliphatic carboxylic acid, preferably an alkanoic acid having from two to seven carbon atoms, such as acetic acid anhydride or propionic acid anhydride, while operating in the presence of an acidic catalyst, particularly an organic sulfonic acid, preferably a benzene sulfonic acid, such as para-toluene sulfonic acid, or a mineral acid such as sulfuric acid or perchloric acid. The reaction may be conducted at room temperatures or at elevated temperatures and, if desired, in the presence of an organic solvent such as a halogenated hydrocarbon, particularly carbon tetrachloride.

Of course, the other non-ketonic functions occurring in the steroid molecule may undergo, during the reaction with the selected acid anhydride, the usual reactions such as the acylation of hydroxyls or of amines.

(2) The fluorination reaction is effected in total absence of light, which avoids the release of certain mechanisms of free radical character and practically completely avoids the formation of chlorinated derivatives.

(3) The fluorination reaction is effected at moderate temperatures such as from about 30° C. to about 70° C.

(4) The fluorination is conducted in the presence of a tertiary cyclic amine such as pyridine or alkylated pyridines such as collidine, and of a di-lower-alkyl amide of a lower alkanoic acid such as dimethylformamide or dimethylacetamide.

(5) After the reaction is terminated, the reaction media may be alkalized which consequently hydrolyzes the ester functions present in the steroid molecule and permits a far easier isolation of the formed fluorinated product.

The process described allows the preparation of physiologically active steroid derivatives or those which can be converted into other derivatives exhibiting a physiological interest.

The starting materials for the process of the invention are steroids containing an 11 ketone and free of other ketonic substituents. In addition, of course, the steroid should be free of unsaturation. Preferably steroids of the pregnane and androstane series are employed. When $5\beta$-pregnane-$3\alpha,20\beta$-diol-11-one or its hydroxyl acylated derivatives are employed, the resultant product, $9\alpha$-fluoro-$5\beta$-pregnane-$3\alpha,20\beta$-diol-11-one is readily converted by well known methods to $9\alpha$-fluoro-cortisol. Similarly, when $16\alpha$-methyl-$5\beta$-pregnane-$3\alpha,20\beta$-diol-11-one or its hydroxyl acylated derivatives are employed, the resultant product, $9\alpha$-fluoro-$16\alpha$-methyl-$5\beta$-pregnane-$3\alpha,20\beta$-diol-11-one serves as an intermediate in the production of $16\alpha$-methylated corticoids such as $16\alpha$-methyl-$9\alpha$-fluoro-prednisolone.

The $9\alpha$-fluoro-11-ketone derivatives corresponding to progesterone and $16\alpha$-methyl-progesterone are physiologically active.

The $9\alpha$-fluoro-11-ketonic steroids may, on the other hand, be converted into corresponding $11\beta$-hydroxy derivatives according to the usual process of reduction, for example by mixed hydrides and in particular by lithium-aluminum hydride or by alkali metal borohydrides.

The following examples will enable a better comprehension of the invention. It is to be understood, however, that they present no limiting characteristics.

EXAMPLE 1

*Preparation of $9\alpha$-fluoro-$5\beta$-pregnane-$3\alpha,20\beta$-diol-11-one*

Step A: *Preparation of $3\alpha,11,20\beta$-triacetoxy-$\Delta^{9(11)}$-$5\beta$-pregnene.*—0.3 cc. of acetic acid anhydride and 0.02 cc. of an aqueous solution containing 60% of perchloric acid were added to a solution of 0.5 gm. of $3\alpha,20\beta$-diacetoxy-$5\beta$-pregnane-11-one [described by E. P. Oliveto, J. Am. Chem. Soc. 75, 488 (1953)], in 5 cc. of carbon tetrachloride. The reaction mixture was maintained at room temperature for several days. Next, the reaction mixture was washed first with a 5% aqueous sodium hydroxide solution, then with water and dried. By evaporation and recrystallization of the raw product formed from the acetone, 200 mg. of $3\alpha,11,20\beta$-triacetoxy-$\Delta^{9(11)}$-$5\beta$-pregnene were obtained, having a melting point of 24-228° C.

Step B: *Preparation of $9\alpha$-fluoro-$5\beta$-pregnane-$3\alpha,20\beta$-diol-11-one.*—5.5 gm. of $3\alpha,11,20\beta$-triacetoxy-$\Delta^{9(11)}$-$5\beta$-pregnane were dissolved in 110 cc. of pyridine and 55 cc. of dimethylformamide and heated under agitation in an oil bath (exterior temperature, 53° C.), in the total absence of light.

Then a stream of perchloryl fluoride was allowed to pass slowly through this solution for a total of 80 minutes. The reaction time was divided into four periods of 20 minutes each, each period followed by allowing the reaction mixture to stand in a closed vessel at a temperature of 50° C. for a period of 2 hours. Next, the reaction mixture was poured into water and extracted with methylene chloride. The extracts were washed first with dilute hydrochloric acid, then with water, dried, filtered and evaporated to dryness under vacuum. After recrystallization from acetone, 3.5 gm. of unreacted $3\alpha,11,20\beta$-triacetoxy-$\Delta^{9(11)}$-$5\beta$-pregnene were obtained.

The mother liquors from the crystallization were evaporated to dryness. The product obtained was dissolved in 4 cc. of methylene chloride. 30 cc. of methanol and 3 cc. of sodium hydroxide solution were added thereto, and the solution was heated to reflux for a period of one hour.

Next, the solution was cooled under atmosphere of nitrogen, poured into water and extracted with methylene chloride. The extracts were washed with water, dried and evaporated to dryness under vacuum. The product obtained was dissolved in methylene chloride and subjected to chromatography through 200 gm. of alumina. The column was eluted with methylene chloride containing 0.8% of methanol and, after removal of the solvent, 880 mg. of $9\alpha$-fluoro-$5\beta$-pregnane-$3\alpha,20\beta$-diol-11-one were obtained. The product had a melting point of 200° C., and a specific rotation $[\alpha]_D^{20}=+7°\pm2°$ (c.=0.5% in chloroform).

The elution with the methylene chloride containing 3% of methanol furnished 230 mg. more of the hydrolyzed starting product.

$9\alpha$-fluoro-$5\beta$-pregnane-$3\alpha,20\beta$-diol-11-one occurred in the form of colorless needles and was insoluble in water, dilute aqueous acids and alkalis, slightly soluble in ether, and soluble in acetone, alcohol and chloroform.

*Analysis.*—$C_{21}H_{33}O_3F$; molecular weight=352.47. Calculated: C, 71.55%; H, 9.44%; F, 5.39%. Found: C, 71.3%; H, 9.6%; F, 5.6%.

This compound is not described in the literature.

EXAMPLE II

*Preparation of $9\alpha$-fluoro-$5\beta$-pregnane-$3\alpha,20\beta$-diol-11-one*

Step A: *Preparation of $3\alpha,11,20\beta$-tripropionoxy-$\Delta^{9(11)}$-$5\beta$-pregnene.*—A mixture of $5\beta$-pregnane-$3\alpha,20\beta$-diol-11-one [described by L. H. Sarett, J. Am. Chem. Soc. 71, 1175 (1949)] and 0.34 part of p-toluene sulfonic acid in 25 volumes of propionic acid anhydride was brought to reflux. The solvent was slowly distilled over a period of 5 hours, all the time adding fresh propionic acid anhydride to the reaction mixture, so that the volume of the reaction mixture was maintained constant.

The reaction mixture was thereafter concentrated under vacuum to about 10 volumes and $3\alpha,11,20\beta$-tripropionoxy-$\Delta^{9(11)}$-$5\beta$-pregnene was allowed to crystallize. The crystals were vacuum filtered and washed several times with acetone.

This compound is not described in the literature.

Step B: *Preparation of $9\alpha$-fluoro-$5\beta$-pregnane-$3\alpha,20\beta$-diol-11-one.*—The $3\alpha,11,20\beta$-tripropionoxy-$\Delta^{9(11)}$-$5\beta$-pregnene was dissolved in a mixture of 10 volumes of dimethylformamide and 20 volumes of pyridine and treated with the perchloryl fluoride in the same manner as described in Example I, Step B.

The raw product of the reaction was then saponified by heating at reflux for 1 hour with an excess of methanolic potassium or sodium hydroxide. The products which resulted were separated by chromatography through a neutral alumina column (100 parts) washed with acid.

The elution with methylene chloride containing 0.8% of methanol furnished $9\alpha$-fluoro-$5\beta$-pregnane-$3\alpha,20\beta$-diol-11- one, and the elution with methylene chloride containing 3% of methanol supplied 5β-pregnane-3α,20β-diol-11-one.

The 9α-fluoro-5β-pregnane-3α,20β-diol-11-one may be converted into a corresponding 11β-hydroxy derivative in the following manner.

EXAMPLE III

*Preparation of 9α-fluoro-5β-pregnane-3α,11β,20β-triol*

550 mg. of 9α-fluoro-5β-pregnane-3α,20β-diol-11-one (obtained by Examples I and II) were introduced into 25 cc. of anhydrous tetrahydrofuran. The mixture was agitated at room temperature and 550 mg. of lithium-aluminum hydride were slowly added thereto. The reaction mixture was agitated for 5 hours thereafter at room temperature, then the excess lithium-aluminum hydride was decomposed. The mixture was decanted, filtered and distilled to dryness under vacuum. The residue was crystallized from a mixture of methylene chloride and ether and 410 mg. of 9α-fluoro-5β-pregnane-3α,11β,20β-triol were obtained having a melting point first at 150° C., then at 210° C., and a specific rotation $[\alpha]_D = +31° \pm 2°$ (c.=0.5% in ethanol).

The product crystallized in the form of colorless needles and was insoluble in water, dilute aqueous acids and alkalis, and soluble in alcohols.

*Analysis.*—$C_{21}H_{35}O_3F$; molecular weight=354.59. Calculated: C, 71.13%; H, 9.95%; F, 5.36%. Found: C, 71.0%; H, 10.0%; F, 5.1%.

This compound is not described in the literature.

EXAMPLE IV

*Preparation of 9α-fluoro-16α-methyl-5β-pregnane-3α,20β-diol-11-one*

*Step A: Preparation of 3α,11,20β-triacetoxy-16α-methyl-$\Delta^{9(10)}$-5β-pregnene.*—0.2 part of sodium borohydride were added to a solution, maintained at 20° C., of 3α-acetoxy-16α-methyl-5 -pregnane-11,20-dione in 20 volumes of absolute ethanol, and the reaction mixture was agitated for 1 hour at the same temperature.

Next, pure acetic acid (0.34 volume) was gradually added and, finally, 40 volumes of water were added thereto to effect the crystallization of the product which was vacuum filtered and washed abundantly with water. Thus, 3α-acetoxy-16α-methyl-5β-pregnane-20β-ol-11-one was obtained.

Over a period of 8 hours the mixture of 3α-acetoxy-16α-methyl-5β-pregnane-20β-ol-11-one and 0.34 part of p-toluene-sulfonic acid in 25 volumes of acetic acid anhydride were heated at reflux while slowly distilling the solvent and periodically adding acetic acid anhydride in order to maintain constant the volume of the reaction media.

The reaction mixture was next concentrated under vacuum to about 9 volumes and 3α,11,20β-triacetoxy-16α-methyl-$\Delta^{9(11)}$-5β-pregnene was allowed to crystallize.

This compound is not described in the literature.

*Step B: Preparation of 9α-fluoro-16α-methyl-5β-pregnane-3α,20β-diol-11-one.*—The 3α,11,20β - triacetoxy-16α-methyl-$\Delta^{9(11)}$-5β-pregnene obtained above, was dissolved in 10 volumes of dimethylformamide and 20 volumes of pyridine and treated with perchloryl fluoride in the manner already described in Example I, Step B.

The recovered raw product was then hydrolyzed by heating at reflux for 1 hour with an excess of methanolic potassium or sodium hydroxide. The products were separated by chromatography through 100 parts of neutral alumina washed with acid. 9α-fluoro-16α-methyl-5β-pregnane-3α,20β-diol-11-one was eluted with methylene chloride containing a small percentage of methanol.

This compound is not described in the literature.

By increasing the percentage of methanol in the methylene chloride, 16α-methyl-5β-pregnane-3α,20β-diol-11-one was eluted, corresponding to the unreacted starting product (hydrolyzed).

To arrive at the corresponding 3,11,20-triketonic derivatives, oxidation can be effected according to the classic processes in steroid chemistry. The ketone function formed in the 3 position, may then be converted into a conjugated α,β-ketone by the introduction of the 4,5 double bond. By such a process, 9α-fluoro-5β-pregnane-3α,20β-diol-11-one may be converted to 9α-fluoro-11-keto-progesterone and 9α-fluoro-16α-methyl-5β-pregnane-3α,20β-diol-11-one may be converted to 9α-fluoro-11-keto-16α-methyl-progesterone.

The preceding specific embodiments are illustrative of the present invention. It is to be understood, however, that other expedients known to those skilled in the art may be employed without departing from the spirit of the invention or the scope of the appended claims.

I claim:

1. A process for the preparation of a 9α-fluoro-11-oxygenated steroid of the pregnane and adrostane series selected from the group consisting of 9α-fluoro-11-oxo steroid and 9α-fluoro-11β-hydroxy-steroids which comprises the steps of reacting an acid anhydride of an alkanoic acid having from two to seven carbon atoms with a saturated 11-oxo steroid of the pregnane and androstane series, free from other ketones in its molecule, in the presence of an acidic catalyst selected from the group consisting of organic sulfonic acids and mineral acids, reacting the resultant 9,11-dehydro-11-ol ester with an alkanoic acid having from two to seven carbon atoms of a saturated steroid of the pregnane and androstane series with gaseous perchloryl fluoride in the presence of a tertiary cyclic amine and a di-lower-alkyl-amide of a lower alkanoic acid, and recovering said 9α-fluoro-11-oxygenated steroid of the pregnane and androstane series.

2. The process of claim 1 wherein said acid anhydride of an alkanoic acid having from two to seven carbon atoms is acetic acid anhydride.

3. The process of claim 1 wherein said acid anhydride of an alkanoic acid having two to seven carbon atoms is propionic acid anhydride.

4. The process of claim 1 wherein said organic sulfonic acid is a benzene sulfonic acid.

5. The process of claim 1 wherein said mineral acid is perchloric acid.

6. A process for the preparation of a 9α-fluoro-11-oxygenated steroid of the pregnane and androstane series selected from the group consisting of 9α-fluoro-11-oxo steroids and 9α-fluoro-11β-hydroxy steroids which comprises the steps of reacting an acid anhydride of an alkanoic acid having from two to seven carbon atoms with a saturated 11-oxo steroid of the pregnane and androstane series, free from other ketones in its molecule, in the presence of an acidic catalyst selected from the group consisting of organic sulfonic acids and mineral acids, reacting the resultant 9,11-dehydro-11-ol ester with an alkanoic acid having from two to seven carbon atoms of a saturated steroid of the pregnane and androstane series with gaseous perchloryl fluoride in the total absence of light and in the presence of a tertiary cyclic amine selected from the group consisting of pyridine and alkylated pyridines and a di-lower-alkyl-amide of a lower alkanoic acid at a temperature from about 30° C. to about 70° C., and recovering said 9α-fluoro-11-oxygenated steroid of the pregnane and androstane series.

7. 3α,11,20β-triacetoxy-16α-methyl-$\Delta^{9(11)}$-5β-pregnane.

8. 3α,11,20β-tripropionoxy-$\Delta^{9(11)}$-5β-pregnene.

9. 9α-fluoro-5β-pregnane-3α,20β-diol-11-one.

10. 9α-fluoro-5β-pregnane-3α,11β,20β-triol.

11. 9α-fluoro-16α-methyl-5β-pregnane-3α,20β-diol-11-one.

12. A process for the preparation of a 9α-fluoro steroid which comprises the steps of reacting an acid anhydride of an alkanoic acid having from two to seven carbon atoms with an 11-oxo steroid of the androstane and pregnane series, free from other carbonyl groups in its molecule, in the presence of an acidic catalyst, reacting the resultant ester of an alkanoic acid having from two to seven carbon atoms with a 9,11-dehydro-11-ol steroid of the androstane and pregnane series with perchloryl fluoride in the presence of an organic solvent and recovering a 9α-fluoro-11-oxo steroid of the androstane and pregnane series.

13. A process for the preparation of a 9α-fluoro steroid wherein the 9α-fluoro-11-oxo steroid of the androstane and pregnane series of claim 12 is reduced by the action of a reducing agent selected from the group consisting of alkali metal borohydrides and lithium aluminum hydride and a 9α-fluoro-11β-ol steroid of the androstane and pregnane series is recovered.

References Cited

UNITED STATES PATENTS 3,316,157   4/1967   Diassi et al. _____ 195—51

ELBERT L. ROBERTS, *Primary Examiner.*